UNITED STATES PATENT OFFICE.

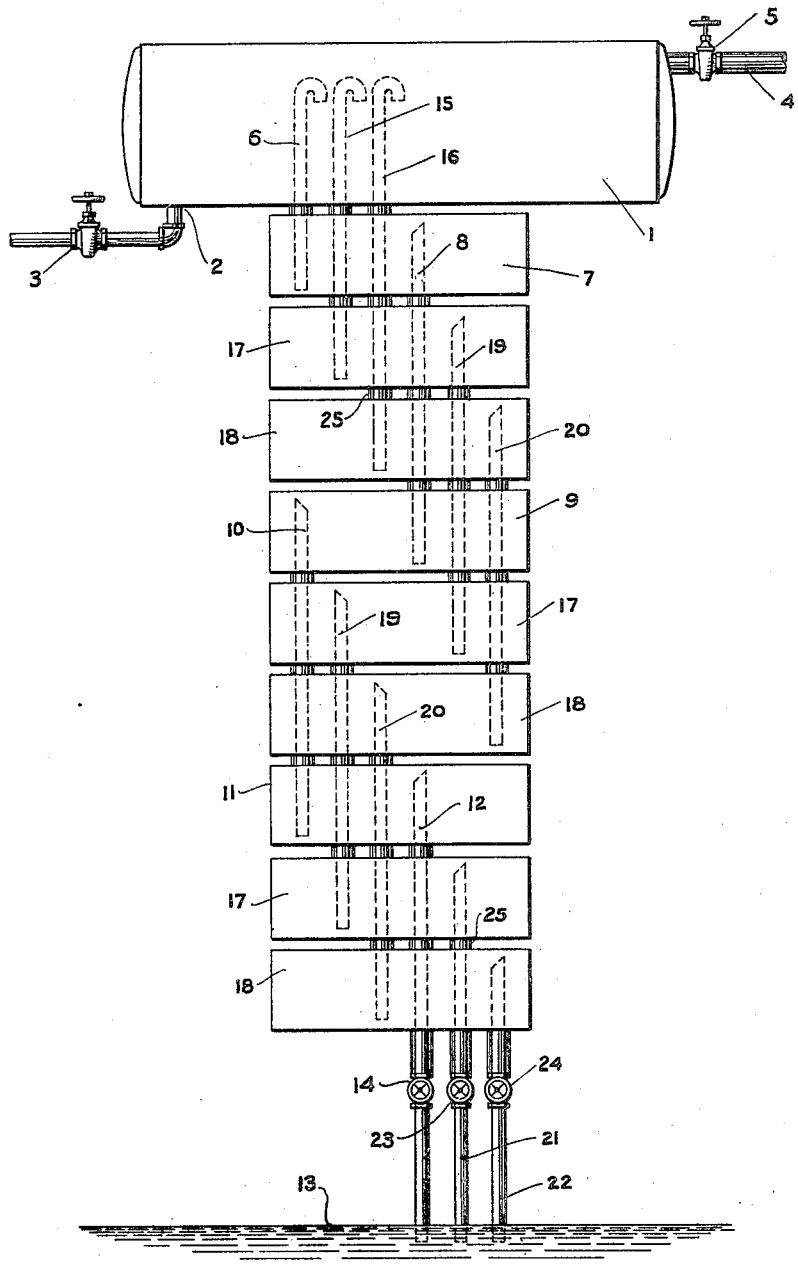

PATRICK H. LYNCH, OF NEW YORK, N. Y.

PUMP.

No. 813,051. Specification of Letters Patent. Patented Feb. 20, 1906.

Application filed February 20, 1905. Serial No. 246,470

*To all whom it may concern:*

Be it known that I, PATRICK H. LYNCH, residing at New York, in the county of New York and State of New York, have invented certain new and useful Improvements in Valveless Pumps, of which the following is a full, clear, and exact description, such as will enable others skilled in the art to which it appertains to make and use the same.

This invention relates to pumping apparatus. One of the objects thereof is to provide efficient apparatus of the above nature in which the necessity for the use of valves or equivalent devices is done away with.

Another object is to provide pumping apparatus which is reliable in action and may be started with speed and certainty.

Other objects will be in part obvious and in part pointed out hereinafter.

The invention accordingly consists in the features of construction, combinations of elements, and arrangement of parts, which will be exemplified in the apparatus hereinafter described and the scope of the application of which will be indicated in the following claims.

The accompanying drawing is a diagrammatic representation of one of various possible embodiments of my invention.

In order to render clearer certain features of my invention, it may here be noted that with pumping apparatus of many types now in common use it is necessary upon starting the same that a considerable period of time elapse before the water is brought to the desired level. This delay is always annoying and, under certain conditions, as in feeding boilers positioned above the source of supply, it may be serious. Another defect with many pumps now in common use is that the same are easily affected by the condition and quality of the water upon which they act, and any grit or other foreign matter therein is not only likely to cut the surfaces of the valves and valve-seats, but in certain cases, as in pumping foul drainage-water, the pump may be so clogged by the sediment deposited therein as to render it inoperative. The above and other defects are obviated in constructions of the following nature.

Referring now to the drawing, there is shown at 1 a storage tank or reservoir provided, as at 2, with an outlet or discharge pipe controlled by the gate 3. It may here be noted that the term "gate" is used throughout this description and the following claims in a broad sense as denoting any means whereby the passage through a conduit of any form may be obstructed Leading into the reservoir or tank 1 is a supply-pipe 4, controlled by a gate 5 for a purpose hereinafter described. Passing through the walls of this tank and adapted to discharge therein is a pipe or conduit 6, terminating at its lower end near the bottom of a lower chamber or tank 7. The latter is preferably of closed form and may be provided with a manhole and other devices of like nature, if desired, the same not being here shown, as they form no part of the present invention.

Connected into the tank 7 is another pipe 8, which passes through the walls of the tank and is adapted to discharge into the upper portion thereof. This pipe passes downwardly into the lower portion of a tank 9, substantially indentical with the tank 7 and connected in turn by pipe 10 with a tank 11, which communicates by pipe 12 with the source of supply 13, the latter pipe having positioned therein a suitable controlling-gate 14. It is to be understood that the showing as regards these tanks is merely diagrammatic and that an indefinite number thereof may be positioned between the reservoir 1 and the source of supply 13, the same being connected as indicated in the case of the three intermediate tanks above described. Reservoir 1 in this embodiment is also provided with supply-pipes 15 and 16, adapted to discharge thereinto, these pipes being respectively connected with series of tanks 17 and 18, interconnected by pipes 19 and 20. This arrangement of each of these series is substantially identical with that first described, and they are respectively connected with the source of supply 13 by suction-pipes 21 and 22, having positioned therein gates 23 and 24.

It will thus be seen that in the illustrative embodiment herein described there are three distinct series of tanks interposed between the source of supply and the upper reservoir, each series having independent connections and being adapted to operate independently when, as on account of the breakage of parts or other reason, one or more of the other series is rendered inoperative. It will be understood that the number of these connecting series may be indefinitely increased, the form shown being merely illustrative of this feature of my invention, which I have found to be of marked value.

An important feature in my invention is embodied in the arrangement of the tanks with reference one to another, whereby each tank of each series is interposed between and rests substantially in contact with a tank of one of the remaining series upon each side. In this manner the distance between the tanks is maintained substantially constant and may be that found to be most efficient for the working of the apparatus, and yet the entire space between the source of supply and the reservoir is utilized. Another feature of importance in this arrangement is that by virtue of the closely-packed disposition of the several tanks the total area of their exposed surfaces is small relative to the total volume inclosed, the value of this being more clearly set forth hereinafter. The exposed portions of the several conduits and of the several tanks are preferably surrounded by a packing 25 of any desired material having a low heat-conducting power, thus reducing to a minimum the cooling effect of the outer air upon the contents of the entire apparatus.

The method of use of the above-described apparatus is as follows: Assuming the several receptacles and conduits to be empty, as when the apparatus is used for the first time, the gate 5 is opened and live steam admitted through the pipe 4 from any desired source. This steam rapidly fills the several tanks and connecting-pipes and drives out the air therein, as through the gates 14, 23, and 24, which are afterward closed, and gate 5 being also closed the steam is permitted to condense. In this manner a vacuum is formed in the entire system which may be under favorable circumstances rendered almost complete. When this state of affairs has been attained, the gates 14, 23, and 24 are opened and water is rapidly drawn into the lowermost tanks 11, 17, and 18 and when said tanks are substantially filled is, through the corresponding pipes 10, 19, and 20, drawn into the next higher tanks, and thus through the several above-described connections into the uppermost tank or reservoir 1. The pump is then in normal working condition and will remain operative until the vacuum has been "broken" or the internal pressure raised to such an extent as to prevent further drawing of the water. Reservoir 1 is then found to be nearly full, and the contents may be drawn off through the discharge-pipe 2 and any desired disposition made of the same. The apparatus is now in normal inoperative condition, each tank being filled to a level above the lower ends of the corresponding pipes leading upwardly therefrom, for, as will be clear from the above description, when the water-level reaches the lower ends of these pipes the tanks next above the same connected therewith will be unable to draw more water. Thus upon the steam being driven in, as above described, the same is permitted to condense, this action being facilitated by the relatively large surfaces of the several tanks, and water is immediately drawn from each series into the reservoir 1, the system being started with substantially no waste of time, as each tank is in condition to supply water to the tank next above the same and is in turn supplied from the tank below. The only time required to start the system is that consumed by the water in rising the comparatively short distance from one tank to that next above connected therewith.

Among the advantages of the arrangement of the tanks above indicated arising from the compactness and other desirable features above pointed out is the fact that there is substantially no waste of the heat of the steam, the same being employed in heating the water drawn and the walls of the several chambers or receptacles holding the same, thus rendering this pumping apparatus peculiarly adapted for use as a means of feeding boilers. In this case substantially none of the energy of the live steam is wasted, the same being employed in heating the water, thus rendering the entire apparatus economical to a high degree.

It will thus be seen that I have provided an apparatus well adapted to accomplish the objects of this invention and possessing many advantages, some of which have been pointed out and some of which can be appreciated only by practical use. The form of pumping apparatus above described is not only quick in starting, but is entirely reliable in action, as, on account of the short distance between the successive tanks connected one with another, each tank readily pumps from that next below the same. The condensation of steam, moreover, is rapid, owing to the relatively large condensing area. Moreover, the apparatus when used for feeding boilers or similar purposes, as above explained, acts as a feed-water heater, thus avoiding a waste of the heat of the steam. It may also be noted that there are no complicated parts, the entire apparatus being of the simplest and most inexpensive construction, and that the same may be run without the use of skilled labor, supervision being substantially unneccessary after the pump is started. The advantageous feature whereby no valves or other parts susceptible to the action of dirt or grit are used has been already pointed out, this feature being of such prominence in this connection that not only is the apparatus unharmed by ordinarily foul water, but it is operative when there is such an extreme amount of comminuted foreign matter therein as to form what is commonly termed "mud." The value of this last-mentioned feature in cases of pumping drainage-water or in reclaiming or dredging operations will be obvious.

Although the above means of producing a vacuum possesses advantages which are peculiar to itself, nevertheless other means may be used and some of the advantageous features of my invention retained with apparatus in which the vacuum is produced by other means.

As many changes could be made in the above construction and many apparently widely different embodiments of my invention could be made without departing from the scope thereof, I intend that all matter contained in the above description or shown in the accompanying drawing shall be interpreted as illustrative and not in a limiting sense.

Having described my invention, what I claim as new, and desire to secure by Letters Patent, is—

1. In apparatus of the class described, in combination, a series of receptacles, a connection between each of said receptacles and the receptacle above the same, said connections projecting within and above the lowermost portions of said receptacles, a connecting-pipe between the lowermost receptacle and a source of supply, and means adapted to conduct steam to the uppermost of said receptacles.

2. In apparatus of the class described, in combination, a series of receptacles, pipes connecting each of said receptacles with a lower receptacle and means adapted to produce a vacuum within said receptacles, said pipes projecting within the said receptacles and terminating intermediate the upper and lower walls thereof.

3. In apparatus of the class described, in combination, a series of receptacles, pipes connecting each of said receptacles with a receptacle below the same, each of said pipes projecting within one of said lower receptacles and terminating within the lower portion thereof, a source of supply, a pipe connecting the lowermost receptacle with the source of supply, and means for conducting steam to said receptacles.

4. In apparatus of the class described, in combination, a series of tanks, suction-pipes connecting each of said tanks with a tank below the same in said series and ending intermediate the upper and lower walls of said tanks, and means adapted to cause a substantially simultaneous pumping of said tanks from those next below in the series through said suction-pipes.

5. In apparatus of the class described, in combination, a source of supply, a reservoir, and two series of receptacles interposed between the same, each of said receptacles being connected with one below the same, connections between the uppermost receptacles and said reservoir and connections between the lowermost receptacles and said source of supply, the receptacles of one of said series alternating in position with the receptacles of the other thereof and being adjacent thereto.

6. In apparatus of the class described, in combination, a source of supply, a reservoir, a plurality of series of receptacles interposed between said source of supply and said reservoir, a connection between the uppermost receptacle of each series and said reservoir, a connection between the lowermost receptacle of each series and said source of supply, intermediate connections between said receptacles of each series, and means adapted to reduce the pressure in said receptacles, the receptacles of each series alternating in position with receptacles of all of the other series.

7. In apparatus of the class described, in combination, a source of supply, a reservoir, a plurality of series of receptacles interposed between said source of supply and said reservoir, a connection between the uppermost receptacle of each series and said reservoir, a connection between the lowermost receptacle of each series and said source of supply, intermediate connections between said receptacles of each series, and means adapted to reduce the pressure in said receptacles, the receptacles of each series alternating in position with receptacles of all of the other series and having their walls substantially in contact with the walls of the receptacles adjacent thereto.

8. In apparatus of the class described, in combination, a reservoir, a source of supply, a plurality of series of receptacles interposed between said reservoir and said source of supply, connections between the uppermost receptacle of each series and said reservoir, connections between the lowermost receptacle of each of said series and said source of supply, connections between said receptacles each receptacle of each of said series alternating in position with receptacles of all of the other series and having their walls substantially in contact with the walls of the contiguous receptacles and means adapted to cause each of said receptacles to draw water from that immediately below the same in said series.

9. In apparatus of the class described, in combination, a reservoir, a source of supply, a plurality of series of receptacles interposed between said reservoir and said source of supply, connections between the uppermost receptacles of each of said series and said reservoir, connections between the lowermost receptacles of each of said series and said source of supply, intermediate connections between the receptacles of each of said series, the connection from each of said receptacles to that next below terminating at the lower portion of the lower receptacle, and means for conducting steam to said reservoir, each of said receptacles alternating in position with receptacles of all of the other series and having its walls substantially in contact with the walls of the contiguous receptacles.

10. In apparatus of the class described, in combination, a series of receptacles, pipes connecting each of said receptacles with a receptacle below the same, said first-mentioned pipes projecting within said receptacles and terminating intermediate the upper and lower portions thereof, a source of supply, a pipe connecting the lowermost receptacle with the source of supply, and means for forcing air from said receptacles.

11. In apparatus of the class described, in combination, a series of receptacles, pipes connecting each of said receptacles with a receptacle below the same, said pipes projecting within and terminating intermediate the upper and lower portions thereof, a source of supply, a pipe connecting the lowermost receptacle with the source of supply and means for forcing air from one of said receptacles.

12. In apparatus of the class described, in combination, a reservoir, a source of supply, a plurality of series of receptacles interposed between said reservoir and said source of supply, connections between the uppermost receptacle of each series and said reservoir, connections between the lowermost receptacle of each of said series and said source of supply, and means adapted to force air from said reservoir, each receptacle of each of said series alternating in position with receptacles of all of the other series, and having their walls substantially in contact with the walls of the contiguous receptacles.

In testimony whereof I affix my signature in the presence of two witnesses.

PATRICK H. LYNCH.

Witnesses:
    H. M. SEAMANS,
    E. FOSTER.